Nov. 12, 1968    M. TURKAT ET AL    3,410,746
GRAIN-ORIENTED PYROLYTIC GRAPHITE FORMS AND
METHOD OF MAKING SAME
Filed March 12, 1964    5 Sheets-Sheet 1

INVENTORS
Michael Turkat &
William A. Robba by *[signature]*

ATTORNEY.

INVENTORS:
Michael Turkat &
William A. Robba

INVENTORS
Michael Turkat &
William A. Robba by  *Samuel J. Steel*
ATTORNEY.

United States Patent Office 3,410,746
Patented Nov. 12, 1968

3,410,746
GRAIN-ORIENTED PYROLYTIC GRAPHITE FORMS
AND METHOD OF MAKING SAME
Michael Turkat, Bayside, and William A. Robba, Shoreham, N.Y., assignors, by mesne assignments, to Space Age Materials Corp., Woodside, N.Y., a corporation of Delaware
Filed Mar. 12, 1964, Ser. No. 351,470
6 Claims. (Cl. 161—7)

This invention relates to pyrolytic graphite devices and components having functionally oriented grain structure and to a method and means of making such devices and components.

By way of illustration, this invention pertains to pyrolytic graphite nose cones and thrust nozzles of rocket propulsion systems. It relates also to other high temperature-exposed components of the type used in space vehicles and in rocket powered missiles. The invention is, of course, not limited to such applications, but these are exceedingly important applications at the present time.

As temperatures of rocket engine and missile propellants attain and exceed 5000° F., it becomes increasingly difficult to use standard graphites, tungsten alloys and other high melting point materials for these purposes, for example, for nozzle inserts. These higher temperatures produce many problems which were previously overcome at temperatures considerably below 5000° F., by the use of such standard and conventional high melting point materials. Illustrative of such problems are excessive ablation, exceedingly high erosion rates, thermal shock, excessive, inadequate or misdirected heat transfer, insufficient thermal insulation, inadequate structural strength, and other problems of like nature with which the standard materials cannot cope. For example, even tungsten alloy nozzle inserts have melted, warped or blown out under operating temperatures in excess of 5000° F. In short, these standard materials simply do not have the ability to withstand the highly elevated temperatures and the structural stresses and strains which are currently attained or experienced in rocket propulsion systems and engines and space vehicles.

We have discovered that a massive form of pyrolytic graphite, produced in accordance with the teachings of our copending patent application Ser. No. 345,487, filed Feb. 17, 1964, and structurally oriented in accordance with the present invention, can successfully be used in such applications as a nozzle insert operating at temperatures closely approaching 7000° F.

It is accordingly the principal object of this invention to provide pyrolytic graphite devices and components of the character described, capable of being used in applications of the character described, under operating temperatures far in excess of 5000° F., and it is further the object of this invention to provide a means and method of producing such devices and components.

More specifically, we have discovered that the solution to the problem of attaining such results resides in the orientation of the grain of the pyrolytic graphite. The term "grain" as used herein is intended to include and to be synonymous with the term "plane" to describe the atomic molecular layers or laminations of graphitic material which are believed to result from the vapor-deposition of pyrolytic graphite as described in our said co-pending patent application. When the laminations separate from each other, they may readily be observed. However, when they remain unseparated and tightly cohesive, they are not readily, if at all, visible. It is, however, understood that a massive form of vapored-deposited pyrolytic graphite comprises a vast number of planes or laminations of molecular depth or thickness.

When pyrolytic graphite is formed on a mandrel or mold by vapor deposition the planes of the graphitic structure resulting therefrom, are disposed in generally parallel relation to the mandrel or mold surfaces and in parallel relation to each other. The planes of the graphite faithfully follow the contours of the mandrel. The direction of heat transfer or conductivity is along the planes, that is, along paths disposed in parallel relation to the planes. Conversely, optimum thermal insulation is attained in perpendicular relation to the planes. Regarding structural strength, great tensile strength is attained along or in parallel relation to the planes, while great compressive strength is achieved across the planes or in perpendicular relationship therewith. Longitudinal compression of the planes may cause the structure to fracture or buckle. A high degree of resistance to ablation, erosion and abrasion is provided both along the planes and at various angles relative thereto.

If the desired planes of the final product are to be generally parallel to its contours, the concept of the present invention may be carried out by designing a mandrel or mold corresponding to the shape and design of such final products. Since the planes follow the contours of the mandrel or mold, they would similarly follow the contours of the product formed thereon. On the other hand, if the desired planes are not to follow the contours of the final product, a mandrel or mold designed to correspond to the shape and contours of the final product would not produce the desired plane orientation. The present invention is concerned with pyrolytic graphite forms whose plane orientation follows the contours of the mandrel or mold as well as with those pyrolytic forms whose plane orientation does not follow such contours.

Referring now to the type of pyrolytic graphite product whose plane orientation does not conform to its surface contours, the present invention may be practiced as follows:

(1) The product itself is designed with respect to its external configuration and dimensions.

(2) The plane orientation of said product is then designed with respect to all functional requirements such as direction of heat transfer and tensile strength.

(3) A mandrel is then designed to correspond to the plane orientation last above mentioned.

(4) A pyrolytic graphite shell is then formed on said mandrel by vapor deposition, the dimensions of the shell to be such as to encompass the dimensions of the final product.

(5) The pyrolytic shell is then removed from the mandrel and machined down to the shape and dimensions of the final product.

It will be understood from this procedure that the final product will correspond in external configuration and dimensions to the design provided in step 1 above set forth. It will further be understood that its internal or structural planar arrangement will correspond to the plane orientation provided in step 2 above set forth. A final product will thereby be achieved which corresponds to all external design and internal plane orientation requirements.

The object of this invention, therefore, is the provision of pyrolytic graphite devices, components and other articles and things, having a predetermined external design or configuration and having a predetermined internal plane pattern or orientation, there being no necessary correspondence or conformity between said external design and said internal pattern.

A corollary object of this invention is the provision of a method and means of producing such pyrolytic graphite devices, components and other articles and things whose internal plane pattern or orientation may or may not correspond or conform to their external design or configuration.

A further object of the invention is the provision of a method of locking the pyrolytic graphite planes together by means other than their normal adhesion.

More specifically, the present method diverts superimposed portions of the planes and funnels them substantially, but not essentially, at right angles to and through the planes. A fairly analogous structure may be found in the growth of a branch out of the trunk of a tree. In effect, the pyrolytic graphite planes are "stitched" or "pinned" together.

This locking effect may be produced by forming apertures or recesses in the mandrel on which the pyrolytic graphite is deposited. The planes of graphite formed on the mandrel tend to funnel into said apertures or recesses, resulting in the pinning effect above mentioned.

The invention is illustrated in the accompanying drawing in which.

Figure 10:
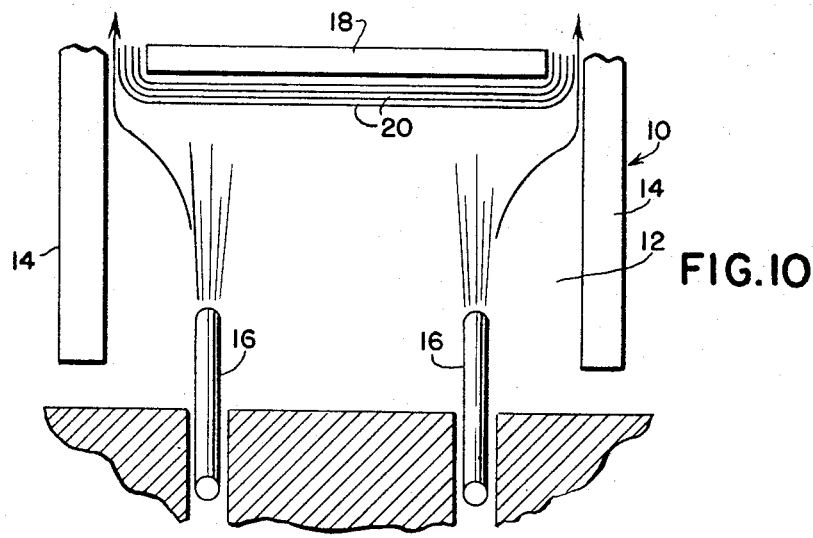
FIGURE 10 is a schematic view showing vapor deposition means for forming a pyrolytic graphite shell of generally uniform thickness on a mandrel.

Referring now to the details of the invention as illustrated in the drawing, it will be understood that FIGURE 10 shows pyrolytic graphite deposition means of the type disclosed in our co-pending patent application above identified, and particularly in FIGURE 2 thereof. It comprises an electric furnace 10 having a deposition chamber 12, a plurality of electric heating elements 14 or the like, and a plurality of gas injectors 16. The heating elements are capable of heating the deposition chamber to a temperature in excess of 2100° C. Hydrocarbon gases either alone or combined with activators or accelerators are injected into the deposition chamber through said injectors.

Mounted within the deposition chamber is a mandrel 18 of predetermined configuration and dimensions. The hydrocarbon gases are cracked and pyrolytic graphite is deposited upon the mandrel in the form of planes or layers 20. The details of this process, of the vapor deposition means, and the materials which may be used in conjunction therewith, and variations thereof, are clearly disclosed in our above identified co-pending patent application, and said details are incorporated herein by reference.

It will be understood that the planes 20 are of atomic or molecular thickness. They are deposited and arranged in substantially parallel relation to the surface configuration of the mandrel and in generally parallel relation to each other. The injectors are symmetrically positioned with respect to the surface area and configuration of the mandrel so that a substantially uniform deposit of pyrolytic graphite is formed thereon.

Figure 11:
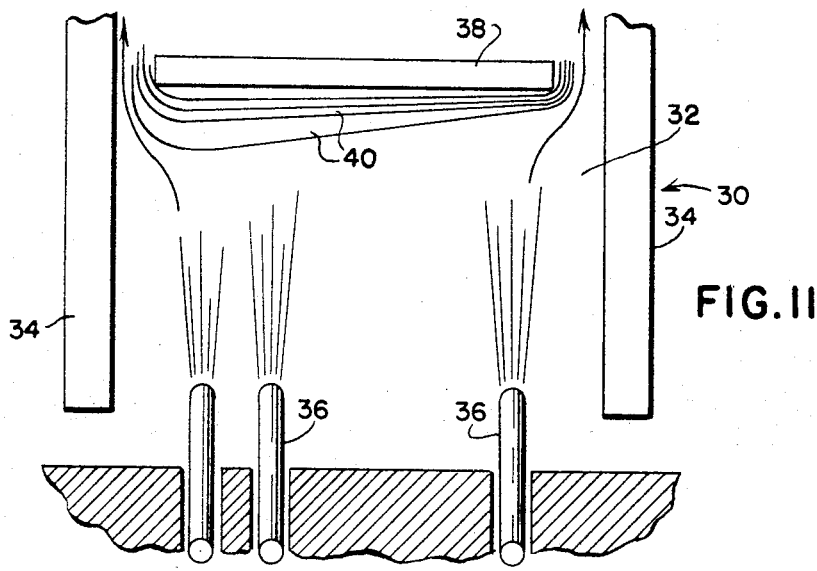
FIGURE 11 is a view similar to that of FIGURE 10 but showing vapor deposition means for forming a pyrolytic graphite shell of non-uniform thickness on a mandrel.

FIGURE 11 shows an electric furnace 30 having a modified gas injector arrangement. The furnace has a deposition chamber 32, a plurality of electric heating elements 34 or the like and a plurality of gas injectors 36. As is the case with electric furnace 10, heating elements 34 are capable of heating the deposition chambers to a temperature above 2100° C.

Mounted within deposition chamber 32 is a mandrel 38 which, for illustrative purposes, will be assumed to have the same configuration and surface area as mandrel 18 above mentioned. It will be noted that injectors 36 are asymmetrically arranged with respect to said mandrel 38, two such injectors being located adjacent one end of said mandrel and one injector being situated adjacent the opposite end of the mandrel. The result is a plurality of planes or layers 40 forming a heavier deposit at the first mentioned end of the mandrel and tapering off to thinner proportions at the opposite end of said mandrel.

The furnaces of FIGURES 10 and 11 are intended to illustrate various forms of vapor deposition means suited for the purposes of the present invention. When uniformly distributed pyrolytic graphite planes are desired for a particular application, use is made of an electric furnace such as is shown in FIGURE 10, with its symmetrically arranged gas injectors. Similarly, a furnace such as is shown in FIGURE 11, with its asymmetrically arranged injectors, is used in applications requiring non-uniform deposits and planes of pyrolytic graphite.

For the purposes of discussing all of the other figures of the drawing it will be assumed that uniformly deposited planes of pyrolytic graphite are desired or specified and consequently the gas injectors are symmetrically arranged with respect to the configuration and surface area and extent of the mandrels shown.

Figure 1A:
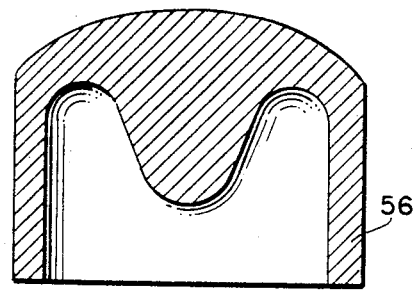
FIGURE 1A is a sectional view showing a mandrel corresponding in surface configuration to the desired plane orientation of the product illustrated in FIGURE 1C.
Figure 1B:
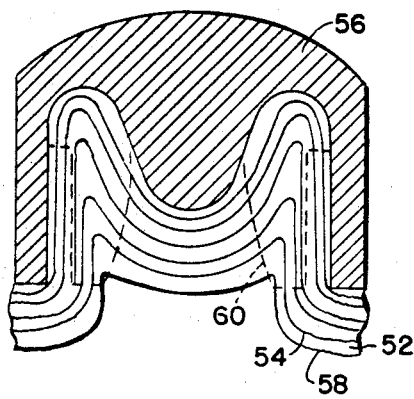
FIGURE 1B is a sectional view of the mandrel of FIGURE 1A, showing a pyrolytic graphite shell formed thereon by vapor deposition and showing further the outline of the final product to be machined therefrom.
Figure 1C:
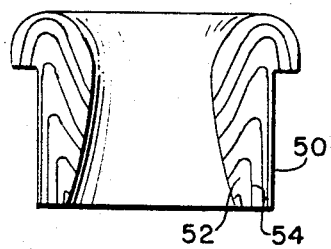
FIGURE 1C is a sectional view of said final product.

FIGURE 1C shows a nozzle insert 50 of true determined design. The design covers not only external configuration and dimensions, but also the internal arrangement and orientation of the pyrolytic graphite planes 52. The nozzle is of hollow or tubular shape and when as shown in FIGURE 1C is a longitudinal section thereof. Consequently, the arrangement of the graphite planes as shown in the lefthand section is the mirror opposite of the graphite plane arrangement shown in the righthand section.

As has above been indicated, these planes represent successive deposits of pyrolytic graphite, such deposits being of atomic or molecular thickness or depth. It will therefore be understood that the showing in the drawing is simply schematic and representative rather than scientifically and technically correct. The spaces between planes are represented by lines 54, and it will similarly be understood that these spaces are of atomic or molecular depth. The direction of heat transfer or conductivity as allows the planes and the spaces between them in parallel relation thereto; the heat insulation factor is greatest in direction perpendicular to said planes and spaces between them. It will thus be understood that the particular arrangement and orientation of the graphite planes as shown in FIGURE 1C, was selected by the designer of the nozzle in accordance with heat dissipation and insulation requirements. This is a design required; the problem is to attain such design in production. The method of attaining such design in actual production will now be decsribed.

A mandrel 56 is designed with a surface configuration corresponding to the required plane orientation shown in FIGURE 1C. More specifically, the mandrel is provided with surface contours which parallel the projected planes specified and shown in the design illustrated in FIGURE 1C. When pyrolytic graphite is deposited upon the mandrel by the means shown, for example, FIGURE 1C, a shell 58 of such pyrolytic graphite is formed on said mandrel, said shell comprising a great many graphite planes 52 and spaces 54 between such planes. The planes parallel the surface configuration of the mandrel, and if the mandrel has properly been designed, such planes will correspond to the arrangement and orientation of planes illustrated in FIGURE 1C.

FIGURE 1B is a longitudinal section through mandrel 56 and shell 58 deposited thereon. An outline 60 of a nozzle 50 is inscribed on said section. It will be observed that the shell is of such shape and proportions that it will encompass the entire outline 60. If the plane orientation within said outline 60 is compared with the plane orientation of nozzle 50, it will be seen that they correspond to each other.

The next step in the procedure is to remove shell 58 from mandrel 56. Conventional means are then used to machine said shell down to the configuration and dimensions of nozzle 50 as shown in FIGURE 1C.

A comparison of the shape of mandrel 56 with the configuration of nozzle 50 will disclose the fact that there is no close resemblance between them. The only real resemblance is between the surface contours of said mandrel and the arrangement or orientation of the pyrolytic graphite planes within the nozzle. The configuration of nozzle 50 is determined by the machining operation.

Figure 2A:
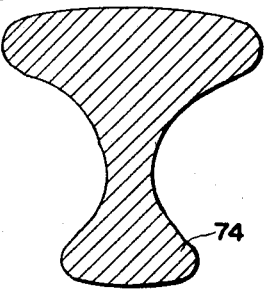
FIGURE 2A is a sectional view showing a mandrel corresponding in surface configuration to the desired plane orientation of the product illustrated in FIGURE 2C.
Figure 2B:
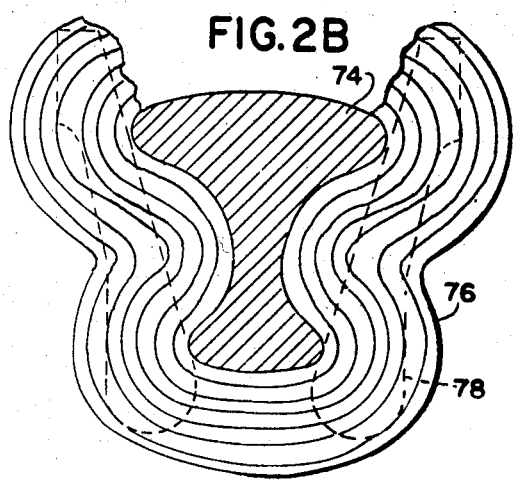
FIGURE 2B is a sectional view of the mandrel of FIGURE 2A, showing a pyrolytic graphite shell formed thereon by vapor deposition and showing further the outline of the final product to be machined therefrom.
Figure 2C:
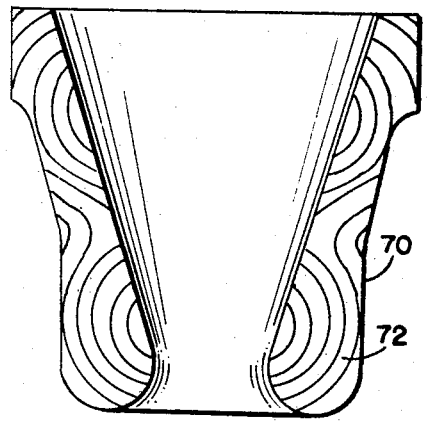
FIGURE 2C is a sectional view of said final product.
Figure 3A:
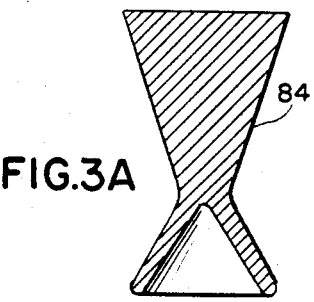
FIGURE 3A is a sectional view showing a mandrel corresponding in surface configuration to the desired plane orientation of the product illustrated in FIGURE 3C.

Referring now to FIGURES 2A, 2B, and 2C, it will be observed that they correspond, respectively, to FIGURES 1A, 1B, and 1C above discussed. The ultimate nozzle design 70 is shown in FIGURE 2C. The required orientation of pyrolytic graphite planes 72 is also shown in FIGURE 2C. This arrangement of planes may be achieved by the use of a mandrel 74 whose surface contours correspond to the contours of said planes. Pyrolytic graphite is deposited upon the mandrel 74 to form a shell 76 of such dimensions as to encompass an outline 78 of the ultimate design. After the shell is formed on the mandrel, the shell is removed therefrom and machined down to the design shown in FIGURE 2C. Should it be required in this connection, as in connection with any other mandrel design, to destroy the mandrel in order to remove the shell, this may, of course, readily be done. The mandrel may be made of frangible material such as graphite or any other material suitable for this purpose.

Figure 3B:
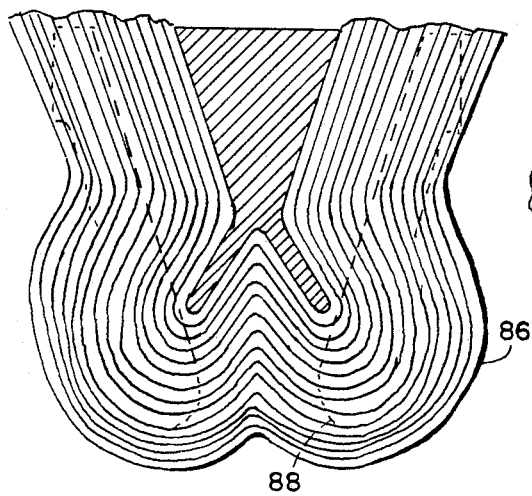
FIGURE 3B is a sectional view of the mandrel of FIGURE 3A, showing a pyrolytic graphite shell formed thereon by vapor deposition and showing further the outline of the final product to be machined therefrom.
Figure 3C:
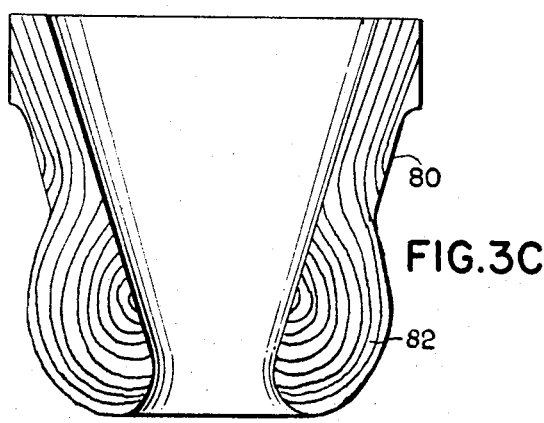
FIGURE 3C is a sectional view of said final product.

FIGURE 3C shows a nozzle design 80 which closely resembles nozzle design 70, except that the arrangement or orientation of planes 82 in nozzle 80 is quite different from that of planes 72 in nozzle 70. The arrangement of planes 82 is reflected in the surface contours of mandrel 84. Pyrolytic graphite may be deposited on said mandrel to form a shell 86 adapted to encompass the ultimate design 80, as indicated by outline 88 in FIGURE 3B. The shell is then removed from the mandrel or vice versa and the shell is then machined to the design specifications of the final product shown in FIGURE 3C.

Figure 4A:
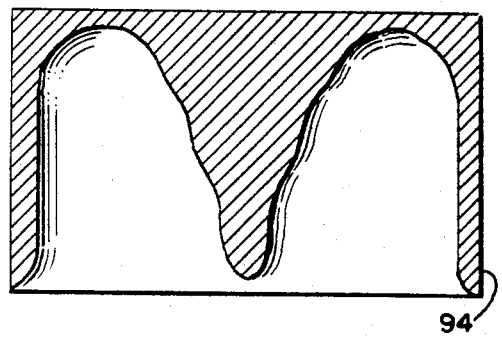
FIGURE 4A is a sectional view showing a mandrel corresponding in surface configuration to the desired plane orientation of the product illustrated in FIGURE 4C.
Figure 4B:
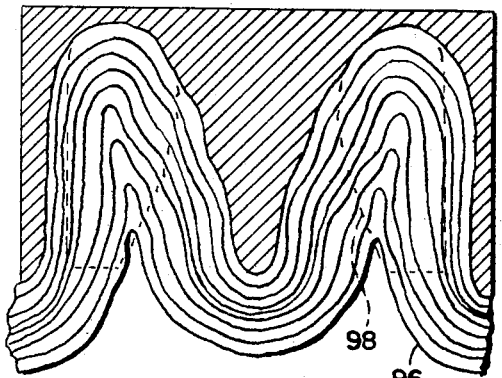
FIGURE 4B is a sectional view of the mandrel of FIGURE 4A, showing a pyrolytic graphite shell formed thereon by vapor deposition and showing further the outline of the final product to be machined therefrom.
Figure 4C:
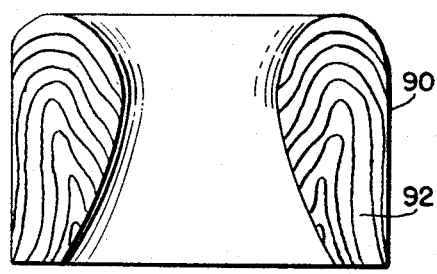
FIGURE 4C is a sectional view of said final product.

What has been said of FIGURES 1A, 1B, and 1C, 2A, 2B, and 2C, and 3A, 3B, and 3C, may also be said of FIGURES 4A, 4B, and 4C. The final product 90 is shown in FIGURE 4C and it is provided with a particular arrangement or orientation of planes 92. This orientation of planes conforms to the surface contours of mandrel 94 shown in FIGURE 4A. A pyrolytic graphite shell 96 may be formed on said mandrel by the deposition of graphite thereon and an outline 98 of the final design may be inscribed thereon. This is shown in FIGURE 4B. The final steps are the removal of the shell from the mandrel and the machining of said shell in accordance with design 98 inscribed thereon to form the final product 90.

Figure 5A:
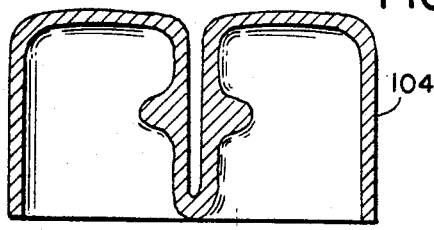
FIGURE 5A is a sectional view showing a mandrel corresponding in surface configuration to the desired plane orientation of the product illustrated in FIGURE 5C.
Figure 5B:
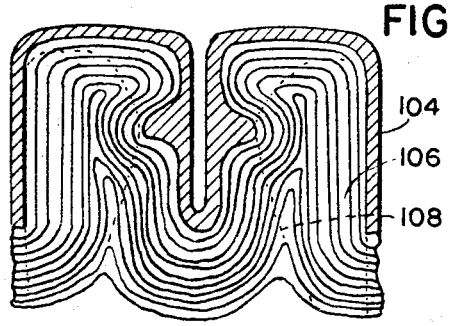
FIGURE 5B is a sectional view of the mandrel of FIGURE 5A, showing a pyrolytic graphite shell formed thereon by vapor deposition and showing further the outline of the final product to be machined therefrom.
Figure 6B:
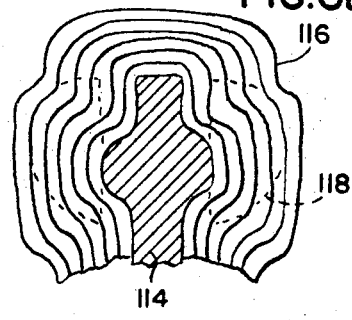
FIGURE 6B is a sectional view of the mandrel of FIGURE 6A, showing a pyrolytic graphite shell formed thereon by vapor deposition and showing further the outline of the final product to be machined therefrom.
Figure 5C:
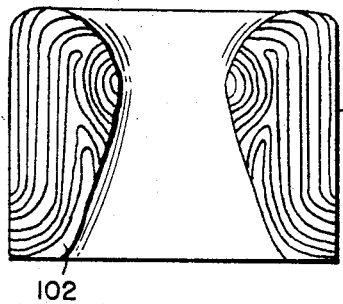
FIGURE 5C is a sectional view of said final product.

FIGURE 5C another pyrolytic graphite form 100 having a plurality of planes 102 of predetermined arrangement and orientation. This is the final product to be achieved and the means for making it includes a mandrel or mold 104 having a surface configuration corresponding to the orientation of planes shown in FIGURE 5C. A pyrolytic graphite shell 106 is deposited upon the mandrel or mold of FIGURE 5A and the result is shown in FIGURE 5B. It will be observed that an outline 108 of the final product 100 may be inscribed upon shell 106. In other words, the proportions of the shell are such as to encompass the configuration and the dimensions of the ultimate product 100. In the final operation, the shell is removed from the mandrel and machined to form said product.

Figure 6A:
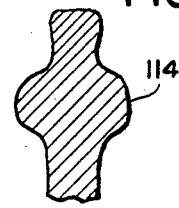
FIGURE 6A is a sectional view showing a mandrel corresponding in surface configuration to the desired plane orientation of the product illustrated in FIGURE 6C.
Figure 6C:
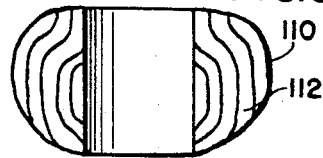
FIGURE 6C is a sectional view of said final product.

The final product 100 shown in FIGURE 5C has a cylindrical outer configuration and a shaped, venturi-like inner configuration. Product 110 shown in FIGURE 6C has a configuration which, speaking generally, reverses the configuration of product 100. Its inner form is cylindrical while its outer form is convexly curved. In order to achieve the pattern or orientation of planes 112 shown in FIGURE 6C, a mandrel 114 is used as shown in FIGURE 6A. A pyrolytic graphite shell 116 is deposited upon mandrel 114 and once again it will be observed that an outline 118 of the ultimate product 110 may be inscribed upon said shell. As the final step in the process, shell 116 is removed from mandrel 114 and machined down to the contours and dimensions of outline 118. The result is the final product 110.

Figure 7A:
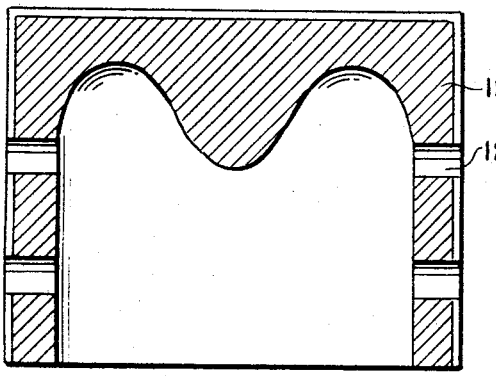
FIGURE 7A is a sectional view showing a mandrel corresponding in surface configuration to the desired plane orientation of the product illustrated in FIGURE 7C.
Figure 9A:
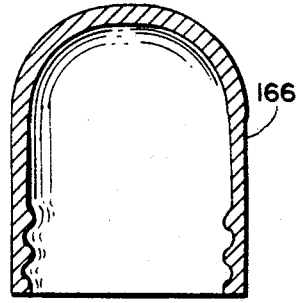
FIGURE 9A is a sectional view showing a mandrel corresponding in surface configuration to the desired surface configuration and plane orientation of the product illustrated in FIGURE 9C.
Figure 7D:
FIGURE 7D is a fragmentary section on the line 7D—7D of FIGURE 7B.
Figure 7B:
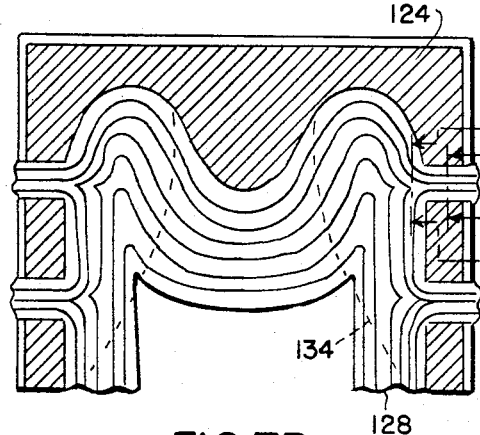
FIGURE 7B is a sectional view of the mandrel of FIGURE 7A, showing a pyrolytic graphite shell formed thereon by vapor deposition and showing further the outline of the final product to be machined therefrom.
Figure 9B:
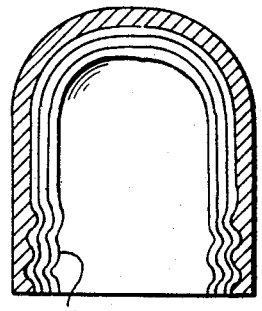
FIGURE 9B is a sectional view of the mandrel of FIGURE 9A, showing a pyrolytic graphite shell formed thereon by vapor deposition and constituting the final product.
Figure 7E:
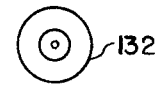
FIGURE 7E is a fragmentary section on the line 7E—7E of FIGURE 7B.
Figure 7C:
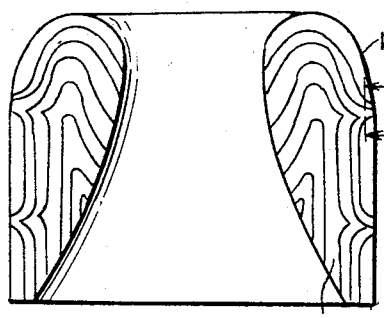
FIGURE 7C is a sectional view of said final product.

The final product 120, shown in FIGURE 7C, happens to be a form of nozzle insert corresponding to a large extent to nozzle insert 90 shown in FIGURE 4C. The essential difference resides in their respective plane patterns. Although the orientation of planes 122 in FIGURE 7C bears close resemblance to the arrangement of planes 92 in FIGURE 4C, there is this difference: In FIGURE 4C the planes are not locked together except insofar as they normally adhere to each other; in FIGURE 7C the planes are locked together by such normal adherence but also by an interlocking form of "stitching" as hereinabove mentioned among the objects of this invention.

Mandrel or mold 124, shown in FIGURE 7A, is used to produce the result shown in FIGURE 7C. Mandrel 124 is provided with the usual deposition surface whose contours correspond to the contours of the planes designed for the final product 120. In addition, however, mandrel 124 is provided with a plurality of apertures 126 communicating with the deposit surface. Consequently, when pyrolytic graphite shell 128 is deposited upon the mandrel 124, some of the deposited material funnels into apertures 126, forming a plane pattern as shown in FIGURE 7B. Apertures 126 may be of cylindrical or other shape and they may extend entirely through the wall or they may form relatively deep but dead-end recesses. Taking the cylindrical shape to be representative and preferred, it will be understood that the configuration of planes formed within each said aperture is shown in FIGURE 7D as comprising a plurality of concentric cylinders 130. It is this cylindrical configuration, together with the funneled configuration 132 in the approach to apertures 126 (see FIGURE 7E) that produces the "stitching" effect which locks the planes together.

Figure 7F:

It will be observed in FIGURE 7E that the funneled configuration 132 also comprises a plurality of concentric planes. This would correspond to the concentric planes 130 shown in FIGURE 7D. It will now be seen that outline 134 inscribed upon shell 128 encompasses the funneled configurations of planes which lead into apertures 126. Outline 134 corresponds, of course, to the outline of nozzle insert 120 shown in FIGURE 7C. Consequently, when shell 128 is removed from mandrel 124 and machined to the configuration of outline 134, the end product will be the nozzle insert 120. Examination of FIGURE 7C will disclose the same plane pattern as appears within outline 134, including the funneled configurations 132. This is shown in FIGURE 7F which, it will be seen, is identical with FIGURE 7E.

Figure 8A:
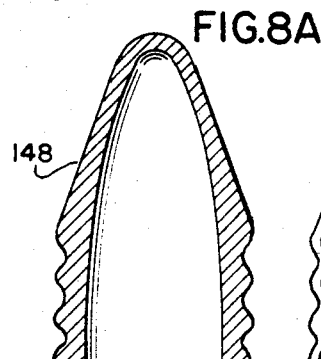
FIGURE 8A is a sectional view showing a mandrel corresponding in surface configuration to the desired surface configuration and plane orientation of the product illustrated in FIGURE 8C.
Figure 8B:
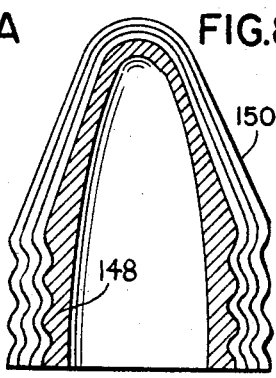
FIGURE 8B is a sectional view of the mandrel of FIGURE 8A, showing a pyrolytic graphite shell formed thereon by vapor deposition and constituting the final product.
Figure 8C:
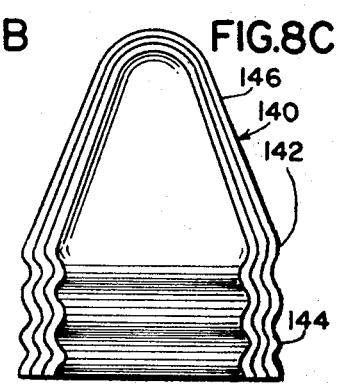
FIGURE 8C is a sectional view of said final product.

FIGURE 8C shows a pyrolytic graphite form 140 of generally conical shape and having a generally cylindrical portion 142 formed with a helical thread 144 extending both externally and internally thereof. Form 140 is also constructed of a plurality of pyrolytic graphite planes 146 which have the arrangement and orientation illustrated in FIGURE 8C, wherein said planes are parallel, substantially, to each other and to both the outer and inner contours of said form, including the helical thread 144. The helical thread is endowed with considerable structural strength by reason of the fact that the graphite planes are contoured to parallel the configuration of the thread. In conventional thread construction, the threads are cut into the planes and the result is a very frangible structure.

The graphite form 140 shown in FIGURE 8 is made by depositing pyrolytic graphite on a mandrel 148 shown in FIGURE 8A. The contours of the outer surface of said mandrel on which the graphite is to be deposited correspond to the plane design of the final product as illustrated in FIGURE 8C. Consequently, when the pyrolytic graphite is deposited upon mandrel 148, a laminated shell 150 is formed thereon. When said shell is removed from the mandrel it becomes the product shown in FIGURE 8C.

Figure 9C:
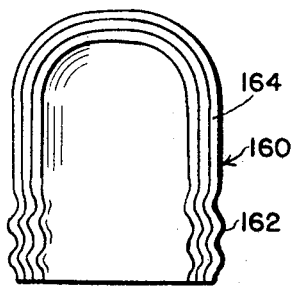
FIGURE 9C is a sectional view of said final product.

FIGURE 9C shows another pyrolytic graphite form 160 which is provided with internal and external threads 162. This form is also made of a plurality of pyrolytic graphite planes 164 which parallel each other and also the internal and external contours of said form. The form is produced on a mandrel 166 having a deposit-receiving surface conforming to the contours of the ultimate product 160. A shell 168 is formed on said mandrel by vapor deposition and when it is removed from the mandrel it becomes the final product 160. The only difference (except for shape) between mandrels 148 and 166 resides in the fact that it is the outer surface of mandrel 148 which receives the deposit while the inner surface of mandrel 166 is the depositing surface thereof.

The foregoing is illustrative of preferred forms of this invention. Enough has been shown, however, to suggest that the present invention may take many different forms and may have many different applications. Although not specifically disclosed herein, all are obviously encompassed within the broad spirit of this invention and the broad scope of the claims.

What is claimed is:

1. The method of making an article of pyrolytic graphite having a desired shape and proportions and a desired functionally oriented grain structure, which comprises the steps of forming a mandrel having an external contour corresponding to the general contour desired in the laminae of said grain structures, forming on said mandrel by vapor deposition a pyrolytic graphite shell which has said desired grain structure and which encompasses at least the proportions and shape of said article, separating said shell from the mandrel, and machining the shell to the said desired shape and proportions.

2. The method of an article of pyrolytic graphite having a desired shape and proportions, a functional external surface design and a functionally oriented internal grain structure, there being no necessary correspondence between said external design and said internal grain structure, which method comprises the steps of forming a mandrel having a deposit-receiving external surface corresponding in contour to said functionally oriented internal grain structure, forming a pyrolytic graphite shell on said external mandrel surface by vapor deposition, separating said pyrolytic graphite shell from the mandrel, and machining the shell to the said desired functional external surface design and proportions.

3. The method of making an article of pyrolytic graphite having a desired shape and proportions, a functional external surface design and a functionally oriented internal grain structure, there being no necessary correspondence between said external design and said internal grain structure, which method comprises the steps of forming a mandrel having a deposit-receiving external surface corresponding in contour to said functionally oriented internal grain structure, forming at least one aperture in said external mandrel surface, depositing pyrolytic graphite on said external mandrel surface and in said aperture by vapor deposition to form a pyrolytic graphite shell having a branch configuration which funnels into said aperture, has an internal plane orientation corresponding to said aperture and ties together the laminae of the internal grain structure of said shell, separating the shell with its branch configuration from the mandrel, and machining the shell to the said desired functional external surface design and proportions.

4. The method of making an article of pyrolytic graphite having a desired shape and proportions, a functional external surface design and a functionally oriented internal grain structure, there being no necessary correspondence between said external design and said internal grain structure, which method comprises the steps of forming a mandrel having a deposit-receiving external surface corresponding in contour to said functionally oriented internal grain structure, forming on said external mandrel surface by vapor deposition a pyrolytic graphite shell having the grain structure, shape and proportions of said article, separating said pyrolytic graphite shell from the mandrel, and machining the shell in accordance with the desired functional external surface design and proportions of said article.

5. A vapor-deposited pyrolytic graphite article of predetermined proportions, having a desired functional external surface contour and a desired functional internal grain structure, said external surface contour and the contour of the various laminae of said grain structure having different configurations.

6. An article according to claim 5 wherein there is no necessary correspondence between the said external surface contour and the said internal grain structure and the said internal grain structure includes at least one transverse lamina having a grain which ties together at least some of the remaining laminae.

References Cited

UNITED STATES PATENTS

| | | | |
|---|---|---|---|
| 3,107,180 | 10/1963 | Diefendorf | 23—209.4 X |
| 3,138,434 | 6/1964 | Diefendorf | 23—209.4 X |
| 3,138,435 | 6/1964 | Diefendorf | 23—209.4 X |
| 3,172,774 | 3/1965 | Diefendorf | 23—209.4 X |
| 3,206,331 | 9/1965 | Diefendorf | 23—209.1 X |

FOREIGN PATENTS 654,294   12/1962   Canada.

JULIUS FROME, *Primary Examiner.*

J. H. WOO, *Assistant Examiner.*